(12) United States Patent
Shimomura et al.

(10) Patent No.: US 7,548,595 B2
(45) Date of Patent: Jun. 16, 2009

(54) APPARATUS AND METHOD FOR FADING FREQUENCY ESTIMATION

(75) Inventors: Tsuyoshi Shimomura, Kawasaki (JP); Dai Kimura, Kawasaki (JP); Tetsuhiro Futami, Kawasaki (JP); Morihiko Minowa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 929 days.

(21) Appl. No.: 10/988,411

(22) Filed: Nov. 12, 2004

(65) Prior Publication Data

US 2006/0007904 A1 Jan. 12, 2006

(30) Foreign Application Priority Data

Jun. 17, 2004 (JP) .............................. 2004-180030

(51) Int. Cl.
*H03K 9/00* (2006.01)
(52) U.S. Cl. .................................................... 375/316
(58) Field of Classification Search .................. 375/316
See application file for complete search history.

(56) References Cited

U.S. PATENT DOCUMENTS

| 7,043,207 | B2 * | 5/2006 | Miyazaki .................. 455/67.11 |
| 7,301,991 | B2 * | 11/2007 | Okumura et al. ............. 375/148 |
| 7,327,799 | B2 * | 2/2008 | Matsumoto .................. 375/267 |
| 2002/0176487 | A1 * | 11/2002 | Fukada ......................... 375/147 |
| 2003/0128780 | A1 | 7/2003 | Okamoto | |
| 2003/0147456 | A1 * | 8/2003 | Kumura ....................... 375/148 |

FOREIGN PATENT DOCUMENTS

| EP | 1 089 451 | 4/2001 |
| EP | 1 113 633 | 1/2004 |
| JP | 08-213933 | 8/1996 |
| JP | 08213933 A | * 8/1996 |
| JP | 2001-223671 | 8/2001 |
| JP | 2001223671 A | * 8/2001 |
| JP | 2001-358621 | 12/2001 |
| JP | 2001358621 A | * 12/2001 |
| JP | 2002077287 A | * 3/2002 |

(Continued)

OTHER PUBLICATIONS

Kuroda, "Multicarrier signal detection and parameter estimation in frequency-selective Rayleigh fading channels", IEEE Transactions on Vehicular Technology, vol. 46, Issue 4, Nov. 1997 pp. 882-890.*

(Continued)

*Primary Examiner*—Juan A Torres
(74) *Attorney, Agent, or Firm*—Katten Muchin Rosenman LLP

(57) ABSTRACT

The invention relates to an apparatus and a method for estimating a fading frequency of incoming received waves in a receiving station of a radio communication system or radio transmission system. An object of the invention is to estimate a fading frequency efficiently and accurately without substantially complexing the configuration of the system. To this end, the invention provides an apparatus for estimating a fading frequency from a pilot signal in a reception signal, which includes a calculation unit for calculating a magnitude of a complex product of two symbols that are received at different instants, and an estimation unit for estimating a fading frequency according to the calculated magnitude of the complex product.

7 Claims, 13 Drawing Sheets

FOREIGN PATENT DOCUMENTS

| | | | |
|---|---|---|---|
| JP | 2003-069451 | | 3/2003 |
| JP | 2003069451 A | * | 3/2003 |
| JP | 2004-120338 | | 4/2004 |
| JP | 2004120338 A | * | 4/2004 |
| WO | WO00/60761 | | 10/2000 |

OTHER PUBLICATIONS

British Search Report dated Apr. 21, 2005.
Japanese Office Action dated Feb. 10, 2009, from the corresponding Japanese Application.

* cited by examiner

F I G. 9

| NUMBER | BAND | |
| --- | --- | --- |
| | LOWER LIMIT FREQUENCY | UPPER LIMIT FREQUENCY |
| 1 | f min1 | f max1 |
| ⋮ | ⋮ | ⋮ |
| p | f minp | f maxp |

33PBT

F I G. 1 0

| SQUARE VALUE OF MAGNITUDE OF COMPLEX PRODUCT | NUMBER OF SYSTEM TO BE USED BY SECOND JUDGING UNIT 33 |
| --- | --- |
| | 1 |
| ⋮ | ⋮ |
| | p |

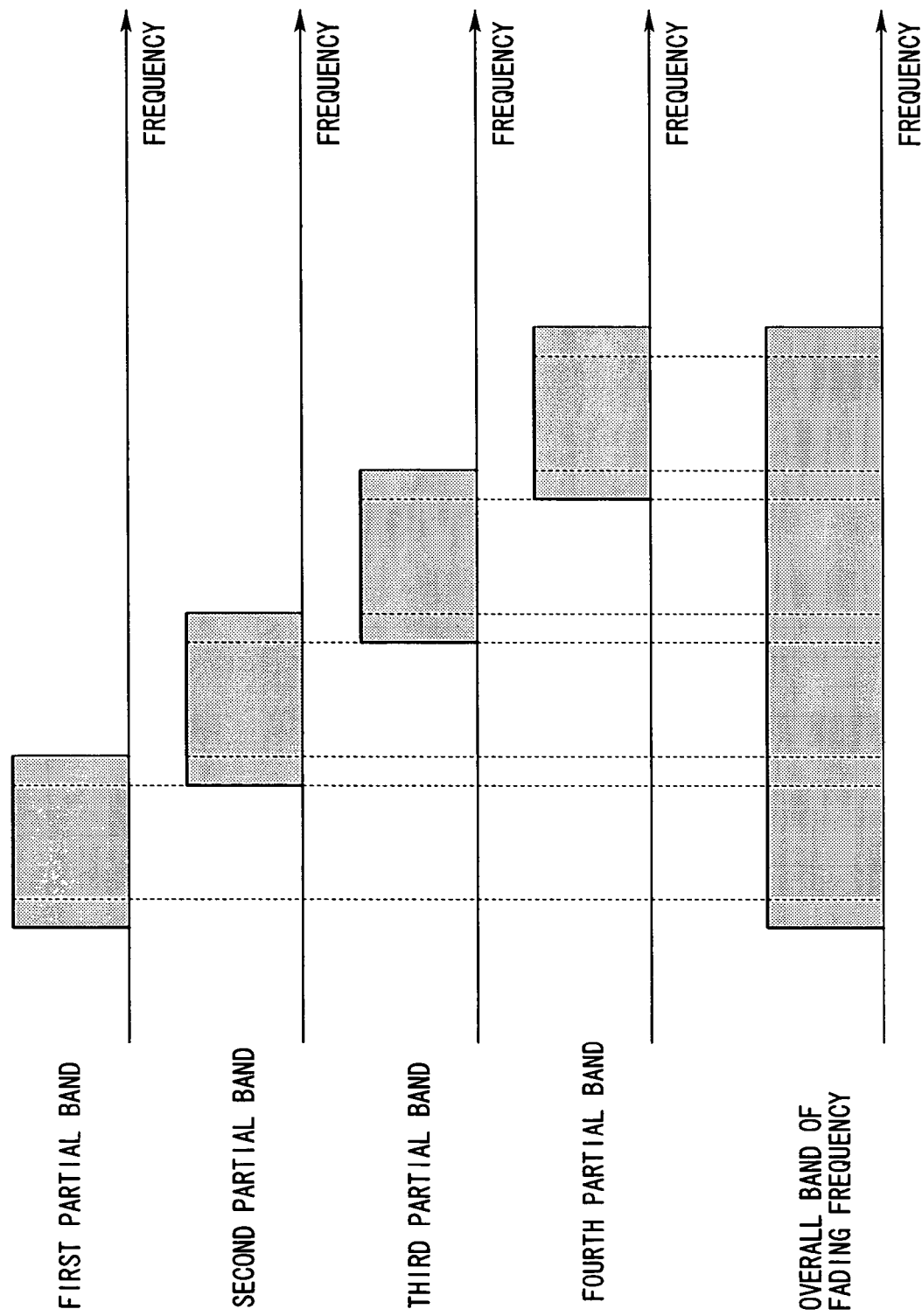

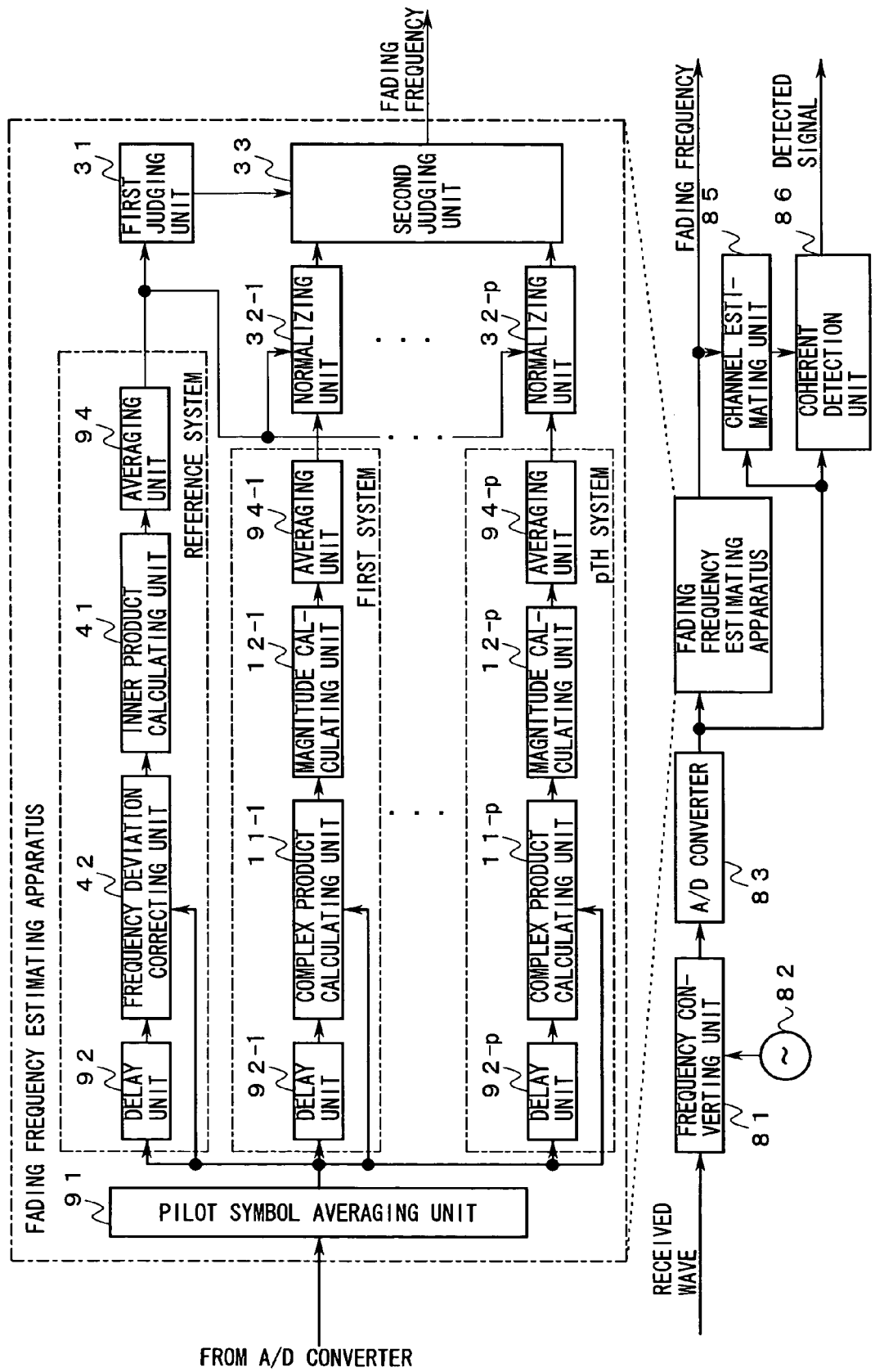

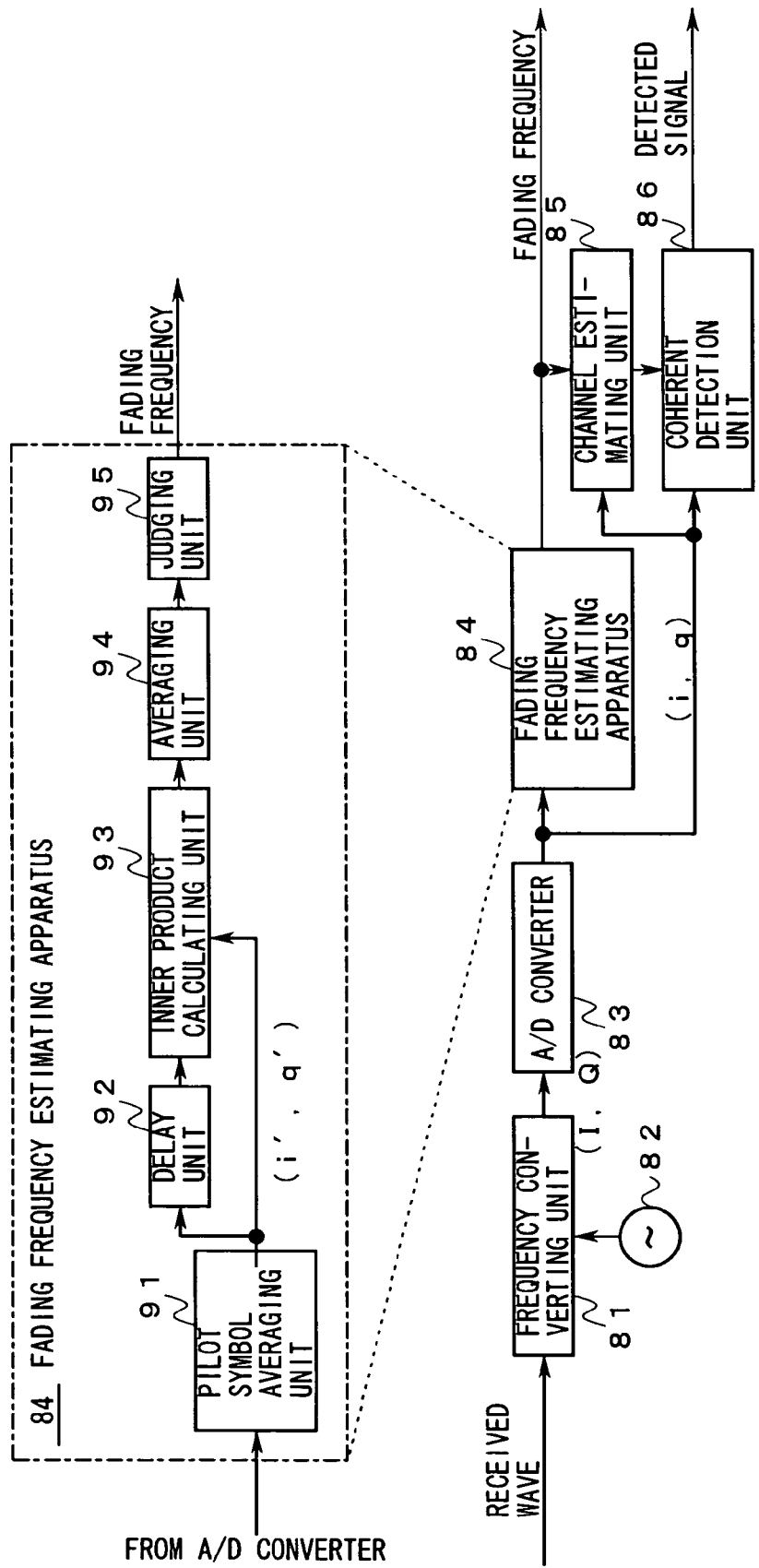

APPARATUS AND METHOD FOR FADING FREQUENCY ESTIMATION

CROSS REFERENCE TO RELATED APPLICATION

This application is based upon and claims the benefit of priority from Japanese Patent Application No. 2004-180030, filed on Jun. 17, 2004, the entire contents of which are incorporated herein by reference.

BACKGROUND OF THE INVENTION

1. Field of the Invention

The present invention relates to an apparatus and a method for estimating a fading frequency of incoming received waves in a receiving station of a radio communication system or a radio transmission system.

2. Description of the Related Art

In receiving stations of mobile communication systems etc., the fading phenomenon that the amplitudes of received waves vary to a large extent occurs because having arrived via multiple paths whose individual transmission characteristics significantly vary, the received waves interfere with each other.

Such receiving stations reduce degradation in channel estimation accuracy by shortening the length of a pilot signal as the fading frequency increases, for example, the pilot signal used for the channel estimation and integrated. Also, They efficiently use radio frequencies and keep the number of terminals that can be accommodated per unit frequency by maintaining the transmitting power at a value that conforms to the fading frequency and the power of received waves.

FIG. 14 shows the configuration of an exemplary receiving station that is equipped with a fading frequency estimating apparatus.

As shown in FIG. 14, received waves are input to the input of a frequency converting unit 81 and the output of a local oscillator 82 is connected to a local frequency input of the frequency converting unit 81. The output of the frequency converting unit 81 is connected to the input of an A/D converter 83, and the output of the A/D converter 83 is connected to the input of a fading frequency estimating apparatus 84 and respective first inputs of a channel estimating unit 85 and a coherent detection unit 86. A fading frequency is obtained at the output of the fading frequency estimating apparatus 84, and the obtained fading frequency is supplied to a second input of the channel estimating unit 85. The output of the channel estimating unit 85 is connected to a second input of the coherent detection unit 86, and a detected signal is obtained at the output of the coherent detection unit 86.

The fading frequency estimating apparatus 84 is composed of the following components:
- a pilot symbol averaging unit 91 that is disposed at the first stage;
- a delay unit 92 whose input is connected to the output of the pilot symbol averaging unit 91;
- an inner product calculating unit 93 whose first and second inputs are connected to the output of the delay unit 92 and the output of the pilot symbol averaging unit 91, respectively; and
- a Cascade-connected averaging unit 94 and a judging unit 95 that are connected to the output of the inner product calculating unit 93.

In the receiving station having the above configuration, the frequency converting unit 81 frequency-converts received waves on the basis of a local frequency signal of a prescribed frequency generated by the local oscillator 82 and thereby generates baseband signals corresponding to two respective orthogonal channels I and Q (in-phase component and quadrature component). The A/D converter 83 A/D-converts these baseband signals and thereby generates base band signals i and q in the digital domain.

In the fading frequency estimating apparatus 84, the pilot symbol averaging unit 91 receives two orthogonal partial baseband signals corresponding to known pilot symbols that have arrived as the received waves and generates noise-suppressed pilot signals i' and q' by averaging each of the in-phase component and the quadrature component.

The delay unit 92 delays the pilot symbols represented by the baseband signals i' and q' by a time equal to, for example, a cycle τ for transmission of the pilot symbols from a mobile station. Cooperating with the delay unit 92, the inner product calculating unit 93 calculates the inner product of two pilot symbols that are received in order with a delay that is equal to the cycle τ on the time axis.

In general, the inner product as used here is defined as the product of two amplitudes and a cosine value of a phase difference of a received pilot symbol and a pilot symbol that is received after a lapse of the time τ from the reception of the former pilot symbol, and hence means correlation between those pilot symbols.

The averaging unit 94 suppresses, through integration, a noise (white noise) component that has been superimposed on the pilot symbols in radio transmission paths formed between the receiving station and the mobile station and whose amplitude average value can be regarded as 0.

The judging unit 95 has a time correlation table that relates to, for example, propagation, satisfying the following requirement, of a radio-frequency signal in a city area and gives, for respective discrete fading frequencies, time correlation values $\rho(\tau)$ that are given by a Bessel function of the first kind $J_0(\cdot)$ (Equation (1)) for the cycle τ and the fading frequency (in general, proportional to the speed v of a mobile station and inversely proportional to the wavelength λ of a received wave).

For received waves of a mobile station, Equation (1) holds in the case where transmission waves that come from a base station and are reflected by scatterers around the mobile station are regarded statistically as incident on the mobile station at approximately the same power for all directions.

For received waves of a base station, Equation (1) holds in the case where transmission waves that are emitted from a mobile station to all directions and are reflected by scatterers around the mobile station are regarded statistically as incident on the base station at approximately the same power.

$$\rho(\tau)=J_0(2\pi f \tau) \quad (1)$$

Further, the judging unit 95 refers to the time correlation table on the basis of the inner product value that is supplied from the averaging unit 94 as described above, and thereby determines a time correlation value $\rho(\tau)$ that is smallest (or having a smallest deviation from the inner product value) among time correlation values larger than the inner product value. The judging unit 95 estimates the fading frequency f of the received waves to be a value corresponding to the determined time correlation value $\rho(\tau)$. In the following description, processing of estimating a fading frequency f by referring to the time correlation table will be referred to as threshold judgment.

The channel estimating unit 85 performs channel estimation for determining transmission characteristics of the above-mentioned radio transmission channels on the basis of deviations of the above-mentioned pilot symbols among the sequences of symbols represented by the baseband signals i and q that are generated by the A/D converter 83. The number of pilot symbols to be referred to in a process of such channel estimation is set smaller as the fading frequency f increases.

Therefore, even if the fading frequency is high, the accuracy of channel estimation is kept higher than in a case that channel estimation is performed on the basis of a constant number of pilot symbols.

The coherent detection unit 86 generates a detected signal by performing coherent detection on the base band signals i and q under the above channel estimation.

Therefore, even if the fading frequency varies widely, the fading frequency is estimated accurately and hence a high transmission quality is maintained.

Prior art techniques relating to the invention are as follows:

(1) A fading pitch detecting apparatus and a portable data terminal using the fading pitch detecting apparatus both for generating a composite signal by combining signals having phase differences occurring in each multiple path and output from a plurality of despreading devices that are connected to a common receiving system and perform despreading for each multiple path and for detecting a fading pitch on the basis of a magnitude relationship between an autocorrelation value of the composite signal and a predetermined threshold value (disclosed in JP, (A), No. 2001-223671);

(2) A frequency offset correcting apparatus for estimating a fading signal sequentially by detecting a correlation signal which is obtained by digitizing a received baseband signal to obtain a digital baseband signal and despreading the digital baseband signal by use of a spreading signal that is shifted in time, and for taking correlation between a correlation value signal and each of a transmitted signal and an estimated signal on the basis of a signal representing a result of the detection (disclosed in Japanese Patent No. 2,705,613);

(3) A CDMA receiver in which a channel estimation value is generated for each symbol by adding each of pilot symbols $P_0$ to $P_S$ to the adjacent (preceding and following) pilot symbols with in-phase adders, a symbol-based channel estimation value is generated immediately before and after an interval when no pilot signals are transmitted, channel compensation and calculation of slot-based channel estimation values are performed by multiplying data symbols by complex conjugates of the above channel estimation values, and weighting coefficients used for the above in-phase addition are controlled by selecting slot-based or symbol-based channel estimation values in accordance with a fading frequency or reception quality (disclosed in JP, (A), No. 2003-69451);

(4) A fading frequency estimating circuit and a CDMA receiving apparatus having that circuit in which noise resistance is increased by determining a fading frequency estimation value by using a slot time correlation value corresponding to a differentially coherent detection output with a minimum slot delay as a denominator and another slot time correlation value as a numerator (an inner product value is normalized prior to its magnitude judgment with respect to a threshold value) and weighted combining etc. are controlled by inputting the fading frequency estimation value to a searcher unit, a weighting coefficients control unit, and an SIR estimating unit (disclosed in JP, (A), No. 2001-358621); and (5) A channel estimating apparatus and method, a demodulation apparatus and method, and a fading frequency determining apparatus and method in which weighting coefficients are varied in accordance with a fading frequency that is determined according to inner product values of pilot symbols (disclosed in WO 00/60761).

In the above conventional examples, the shorter the interval on the time axis between two pilot symbols determining an inner product value to be judged, the lower the accuracy of the threshold judgment. Therefore, a low fading frequency is determined by a threshold judgment with a longer interval between two pilot symbols, which requires a delay circuit that provides a long delay time.

However, in general, the oscillation frequency of the local oscillator 82 provided in the receiving station has a deviation (hereinafter referred to as first deviation) from the oscillation frequency of a local oscillator of a transmitting station and the frequencies of receiving waves may have deviations (hereinafter referred to as second deviations) that are caused by the Doppler effect in propagation paths.

Therefore, it is needed to determine an inner product value to be subjected to the threshold judgment after correction of phase errors in pilot symbols due to the first and second deviations d. However, in practice, it is difficult to extract the first and second deviations from the fading component since they are included in a fading component of incoming received waves.

On the other hand, in recent years there has been a strong demand for mobile communication systems to improve their performance and added values by utilizing highly advanced digital signal processing etc. It is strongly desired that a fading frequency of received waves be determined accurately at a low cost.

SUMMARY OF THE INVENTION

An object of the present invention is to estimate a fading frequency efficiently and accurately without substantially complexing the configuration of the fading frequency estimating apparatus.

Another object of the invention is to perform various kinds of processings in conformity with an accurately, efficiently estimated fading frequency, to increase the transmission quality and the service quality by these processings, and to enhance the added value in radio communication systems and radio transmission systems.

Another object of the invention is to increase the accuracy of an estimated fading frequency with a great reduction in the throughput compared with that of the conventional examples.

Another object of the invention is to enhance the accuracy of an estimated fading frequency.

Still another object of the invention is to determine a phase deviation or a frequency deviation in received waves and enable desired processing that conforms to the phase deviation or frequency deviation.

Another object of the invention is to reduce the consumption of such resources as electric power.

Yet another object of the invention is to make the invention applicable by utilizing existing hardware or software even to a receiving station in which the existing hardware or software calculates one or both of an inner product and a frequency deviation.

A further object of the invention is to adapt to variations in the characteristics of a propagation path and to thereby increase the accuracy of an estimated fading frequency.

The invention is summarized as follows.

According to one aspect of the invention, a calculation unit calculates a magnitude of a complex product of two symbols that are received at different instants. An estimation unit estimates a fading frequency according to the calculated magnitude of the complex product. The magnitude of the complex product of two symbols used for the fading frequency estimation signifies amplitude correlation between the two symbols and does not depend on a phase deviation between the symbols. In the conventional examples an inner product is calculated in replace of the magnitude of the complex product. In general, the throughput necessary for calculation of the inner product is lower than that necessary for calculating the magnitude of the complex product; however, to correct an error in the phases of the two symbols, it is required to calculate values of trigonometric functions that requires much more throughput than a difference between the above two kinds of throughput.

According to the present invention, an averaging unit averages a real part and an imaginary part of the complex product of the two symbols that are received at the different instants. The calculation unit calculates a magnitude of the averaged complex product. The present invention makes it possible to accurately calculate the two complex numbers even if the level of a reception signal or the transmission quality varies.

According to another aspect of the invention, a first calculation unit has a first delay time to calculate a magnitude of a first complex product of two different symbols. A second calculation unit has a second delay time to calculate a magnitude of a second complex product of two different symbols. A normalizing unit normalizes the magnitude of the second complex product by the magnitude of the first complex product. An estimation unit estimates a fading frequency according to the normalized magnitude of the complex product.

A noise component is superimposed on a result of the normalization in accordance with variations in the characteristics of propagation paths, and the amount thereof decreases as an interval on the time axis at which the magnitudes of the two complex products to be subjected to the normalization are calculated decreases.

According to another aspect of the invention, a plurality of calculation units have different delay times and each calculate a magnitude of a complex product of two different symbols. One of the calculation units calculates a magnitude of a reference complex product and the rest of the calculation units calculate magnitudes of non-reference complex products. A first estimation unit estimates a fading frequency according to the magnitude of the reference complex product. A second estimation unit selects one of the magnitudes of the non-reference complex products according to the fading frequency estimated by the first estimation unit, to estimate a fading frequency according to the selected magnitude of the non-reference complex product.

That is, it is able to estimate a fading frequency in a band including a fading frequency roughly estimated by the first estimation unit in advance, by setting an interval on the time axis at which two different symbols are received such that the magnitude of the complex product of the two symbols varies at such a high rate as to obtain a high estimation accuracy.

According to still another aspect of the invention, a magnitude of a complex product of two symbols received at different instants is calculated to estimate a fading frequency according to the calculated magnitude of the complex product. The magnitude of the complex product of two symbols used for the fading frequency estimation signifies amplitude correlation between the two symbols and does not depend on a phase deviation between the symbols. In the conventional examples an inner product is calculated in replace of the magnitude of the complex product. In general, the throughput necessary for calculation of the inner product is lower than that necessary for calculating the magnitude of the complex product; however, to correct an error in the phases of the two symbols, it is required to calculate values of trigonometric functions that requires much more throughput than a difference between the above two kinds of throughput.

According to another aspect of the invention, an arithmetic operation unit calculates a magnitude m of a product of two symbols in their complex domain. The two symbols are associated with a same signal position and received at different instants. An estimation unit estimates the fading frequency to be such a value that the magnitude m corresponds to an absolute value of a time correlation value between the two symbols. The time correlation value depends on a difference $\tau$ between the different instants on the time axis and on a wavelength $\lambda$ of a carrier wave used for transmission of the two symbols.

The magnitude m of the product of two symbols in the complex domain signifies amplitude correlation between the two symbols but does not depend on a phase deviation between the symbols. In general, the variation rate of the magnitude m is higher than that of the inner product of the symbols in a low fading frequency range. Further, in the conventional examples an inner product is calculated in replace of the magnitude m. In general, the throughput necessary for calculation of the inner product is lower than that necessary for calculating the magnitude m; however, to correct an error in the phases of the two symbols, it is required to calculate values of trigonometric functions that requires much more throughput than a difference between the above two kinds of throughput According to another aspect of the invention, an arithmetic operation unit calculates a ratio r=m2/m1 between magnitudes m1 and m2 of products of a first symbol and a second symbol and the first symbol a third symbol in their complex domain. The first to third symbols are associated with a same signal position and received at different instants t1, t2, and t3 in time-series order, respectively. An estimation unit estimates the fading frequency to be such a value that the ratio r corresponds to an absolute value of a time correlation value between the first and third symbols. The time correlation value depends on a difference $\tau$=t3−t1 between the different instants t1 and t3 on the time axis and on a wavelength $\lambda$ of a carrier wave used for transmission of the three symbols.

The normalization makes it possible to obtain a ratio between the absolute values of correlation values depending only on the magnitude of the fading frequency even when the receiving power or the noise power varies with time.

According to another aspect of the invention, a phase deviation calculating unit calculates an average value of phase angles of individual products in their complex domain or an average value of variation rates of the phase angles. That is, a phase deviation or a frequency deviation in each received symbol is calculated by effectively utilizing the products in the complex domain that are calculated in the process of estimation of a fading frequency.

According to another aspect of the invention, an arithmetic operation unit calculates magnitudes m1 to mp−1 of products of a first symbol and second to pth symbols among a plurality p of symbols in their complex domain. The plurality p (p being greater than or equal to 3) of symbols are associated with a same signal position and received at p different instants t1 to tp in time-series order, respectively. A rough estimation unit roughly estimates a fading frequency to be such a value that the magnitude m1 corresponds to an absolute value of a first time correlation value between the first and second symbols. The first time correlation value depends on a difference $\tau$=t2−t1 between different instants t1 and t2 on the time axis and on a wavelength $\lambda$ of a carrier wave used for transmission of the p symbols. A storing unit stores therein in advance bands in which a fading frequency is obtained with desired accuracy at such values that correspond to second to (p−1)th time correlation values between the first symbol and the third to pth symbols. The second to (p−1) time correlation values depend on the wavelength λ and respective differences τ1=t3−t1, . . . , τp−2=tp−t1 between the instant t1 and different instants t3 to tp on the time axis. An estimation unit estimates the fading frequency to be such a value that a magnitude mi corresponds to an absolute value of an ith one of the second to (p−1)th time correlation values. The ith (i satisfying a relationship 2≦i≦p−1) time correlation value corresponds to a particular band that is stored in the storing unit and includes the roughly estimated fading frequency.

That is, a fading frequency is estimated in a band including the fading frequency roughly estimated in advance by the rough estimation unit by using any of the differences τ1, . . . , τp−2 on the time axis which allows the absolute value of the time correlation value to vary at such a high rate that high estimation accuracy is obtained.

Moreover, the arithmetic operation unit calculates magnitudes m2 to mp−1 of individual products of the first symbol and the third to pth ones of the p symbols in their complex domain after the particular band is determined. That is, the throughput of the arithmetic operation unit is made lower than when the calculation of any of the magnitudes m2 to mp−1 of the products in the complex domain is started before the determination of the particular band.

According to yet another aspect of the invention, a particular arithmetic operation unit corrects a phase deviation in the first and second ones of a plurality p of symbols and then calculates an inner product of the first and second symbols. The plurality p (p being greater than or equal to 3) of symbols are associated with a same signal position and received at p different instants t1 to tp in time-series order, respectively. The phase deviation is caused from a frequency deviation in a local frequency signal used for receiving the plurality p of symbols. An arithmetic operation unit calculates magnitudes m2 to mp−1 of products of the first symbol and third to pth symbols among the p symbols in their complex domain. A rough estimation unit roughly estimates a fading frequency to be such a value that the inner product corresponds to a first time correlation value between the first and second symbols. The first time correlation value depends on a difference τ=t2−t1 between different instants t1 and t2 on the time axis and on a wavelength λ of a carrier wave that is used for transmission of the p symbols. The storing unit stores therein in advance bands in which a fading frequency is obtained with desired accuracy at such values that correspond to second to (p−1)th time correlation values between the first symbol and third to pth symbols. The second to (p−1)th time correlation values depend on the wavelength λ and respective differences τ1 = t3−t1, . . . , τp−2=tp−t1 between the instant t1 and different instants t3 to tp on the time axis. An estimation unit estimates the fading frequency to be such a value that a magnitude mi corresponds to an absolute value of an ith one of the second to (p−1)th time correlation values which corresponds to a particular band that is stored in the storing unit and includes the roughly estimated fading frequency, i satisfies a relationship 2≦i≦p−1.

Calculated after the above-mentioned frequency deviation is compensated, the inner product, as the above-mentioned product in the complex domain, signifies amplitude correlation between symbols received at different instants and does not depend on the phase difference between the symbols.

According to a further aspect of the invention, a particular arithmetic operation unit corrects a phase deviation in an inner product of first and second ones of a plurality p (p being greater than or equal to 3) of symbols that are associated with a same signal position and received at p different instants t1 to tp in time-series order, respectively. The phase deviation is caused from a frequency deviation in a local frequency signal used for reception of the first and second symbols. An arithmetic operation unit calculates magnitudes m2 to mp−1 of individual products of the first symbol and third to pth symbols in their complex domain. A rough estimation unit roughly estimates a fading frequency to be such a value that the corrected inner product corresponds to a first time correlation value between the first and second symbols. The first time correlation value depends on a difference τ=t2−t1 between different instants t1 and t2 on the time axis and on a wavelength λ of a carrier wave used for transmission of the p symbols. A storing unit stores therein in advance bands in which a fading frequency is obtained with desired accuracy at such values as correspond to second to (p−1)th time correlation values between the first symbol and third to pth symbols. The second to (p−1)th time correlation values depend on the wavelength λ and respective differences τ1=t3−t1, . . . , τp−2=tp−t1 between the instant t1 and different instants t3 to tp on the time axis. An estimation unit estimates the fading frequency to be such a value that a magnitude mi corresponds to an absolute value of an ith one of the second to (p−1)th time correlation values, i satisfying a relationship 2≦i≦p−1. The ith time correlation value corresponds to a particular band that is stored in the storing unit and includes the roughly estimated fading frequency.

Since the inner product is calculated first and thereafter the phase deviation in the inner product is corrected, the corrected inner product, as the above-mentioned product in the complex domain, signifies amplitude correlation between symbols received at different instants, and does not depend on the phase difference between the symbols.

According to another aspect of the invention, the arithmetic operation unit calculates a magnitude of a product of each pair of symbols from a combined wave of a plurality of received waves transmitted via multiple paths. In this case, the magnitude of the product in the complex domain is obtained by effective use of power of received waves transmitted via the multiple paths even when propagation paths are multiple paths.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 9 shows the structure of a partial band table;

FIG. 10 shows the structure of a system number table;

FIG. 11 shows a special arrangement of partial bands on the frequency axis;

FIG. 12 shows a fifth embodiment of the invention;

FIG. 14 shows the configuration of an exemplary receiving station that is equipped with a fading frequency estimating apparatus.

DESCRIPTION OF THE PREFERRED EMBODIMENTS

Embodiments of the present invention will be hereinafter described in detail with reference to the drawings.

First Embodiment

Figure 1:
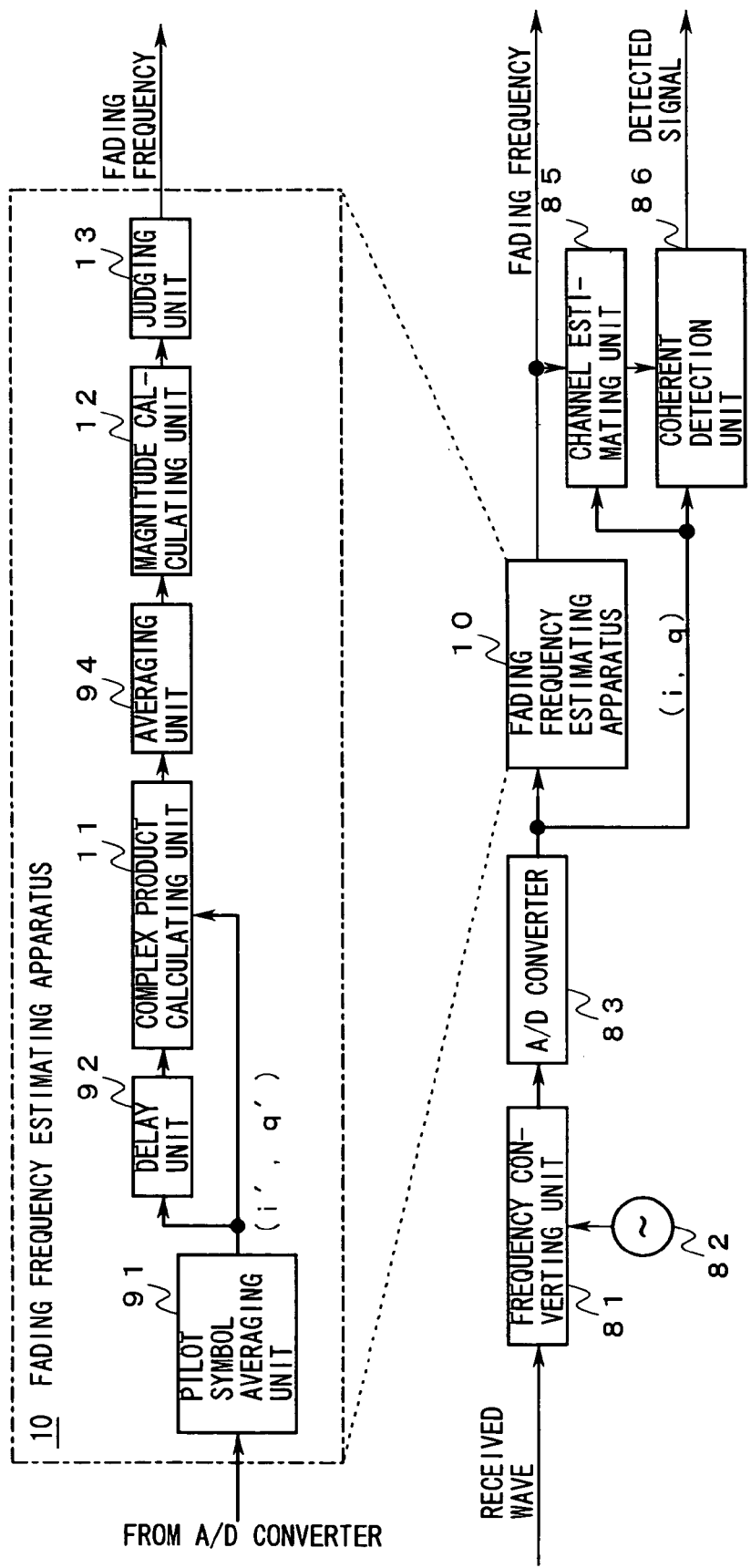
FIG. 1 shows a first embodiment of the invention.

FIG. 1 shows a first embodiment of the invention.

As shown in FIG. 1, received waves are input to the input of a frequency converting unit 81 and the output of a local oscillator 82 is connected to a local frequency input of the frequency converting unit 81. The output of the frequency converting unit 81 is connected to the input of an A/D converter 83, and the output of the A/D converter 83 is connected to the input of a fading frequency estimating apparatus 10 and respective first inputs of a channel estimating unit 85 and a coherent detection unit 86. A fading frequency is obtained at the output of the fading frequency estimating apparatus 10, and the obtained fading frequency is supplied to a second input of the channel estimating unit 85. The output of the channel estimating unit 85 is connected to a second input of the coherent detection unit 86, and a detected signal is obtained at the output of the coherent detection unit 86.

The fading frequency estimating apparatus 10 is composed of the following components:

a pilot symbol averaging unit 91 disposed at the first stage;

a delay unit 92 whose input is connected to the output of the pilot symbol averaging unit 91;

a complex product calculating unit 11 whose first and second inputs are connected to the output of the delay unit 92 and the output of the pilot symbol averaging unit 91, respectively; and a cascade-connected averaging unit 94, a magnitude calculating unit 12, and a judging unit 13 that are connected to the output of the complex product calculating unit 11.

Figure 2:
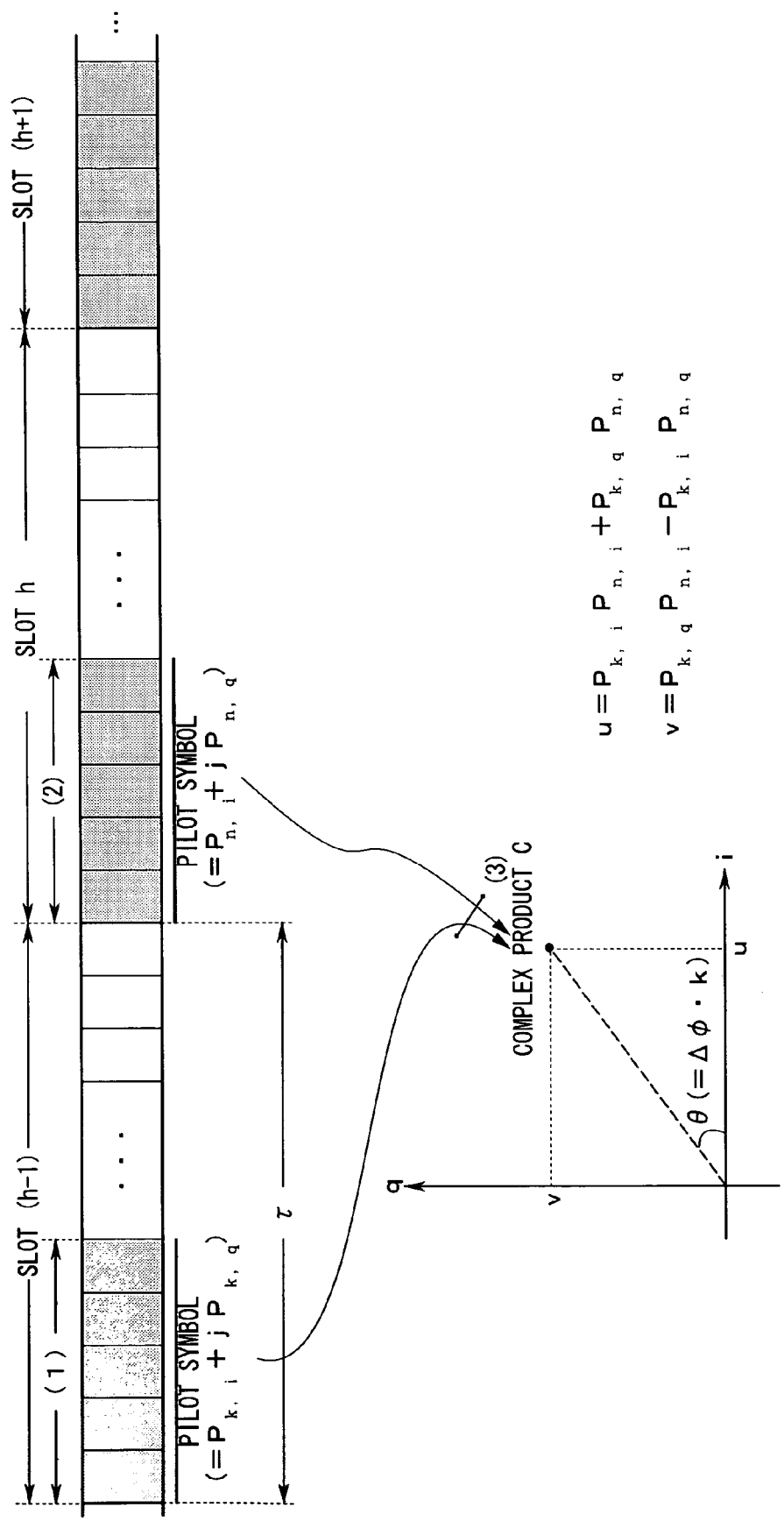
FIG. 2 illustrates the operations of the first to third embodiments.

FIG. 2 illustrates the operations of the first to third embodiments. The operation of the first embodiment will be described below with reference to FIGS. 1 and 2.

As in the case of the conventional example, the A/D converter 83 generates base band signals i and q in the digital domain that correspond to two orthogonal channels I and Q, respectively, by A/D-converting frequency-converted received waves.

In the fading frequency estimating apparatus 10, the pilot symbol averaging unit 91 receives two orthogonal partial baseband signals corresponding to known pilot symbols that arrive as the received waves and generates noise-suppressed pilot signals i' and q' by averaging each of the in-phase component and the quadrature component.

The delay unit 92 gives a delay that is equal to, for example, a cycle $\tau$ of slot-by-slot transmission of the pilot symbols from a mobile station to the pilot symbols represented by the baseband signals i' and q'. Cooperating with the delay unit 92, the complex product calculating unit 11 calculates, according to the following Equation (2), a complex product C (indicated by symbol (3) in FIG. 2) of two pilot symbols $(P_{K,i}+jP_{K,q})$ and $(P_{n,i}+jP_{n,q})$ (indicated by symbols (1) and (2) in FIG. 2) that are received in order in periods K and n having an interval that is equal to the cycle $\tau$ on the time axis:

$$C=(P_{K,i}+jP_{K,q})(P_{n,i}+jP_{n,q})^* \tag{2}$$

The averaging unit 94 suppresses, through integration, noise (white noise) that has been superimposed on the complex product C because of variations in the characteristics of radio transmission paths formed between the receiving station and the mobile station and whose average value can be regarded as 0.

The magnitude calculating unit 12 calculates, according to the following Equation (3), the square value S of the absolute value of the complex product that is supplied from the averaging unit 94:

$$S = |(P_{K,i} + jP_{K,q})(P_{n,i} + jP_{n,q})^*|^2 \tag{3}$$
$$= (P_{K,i}P_{n,i} + P_{K,q}P_{n,q})^2 + (P_{K,q}P_{n,i} - P_{K,i}P_{n,q})^2$$

Figure 3:
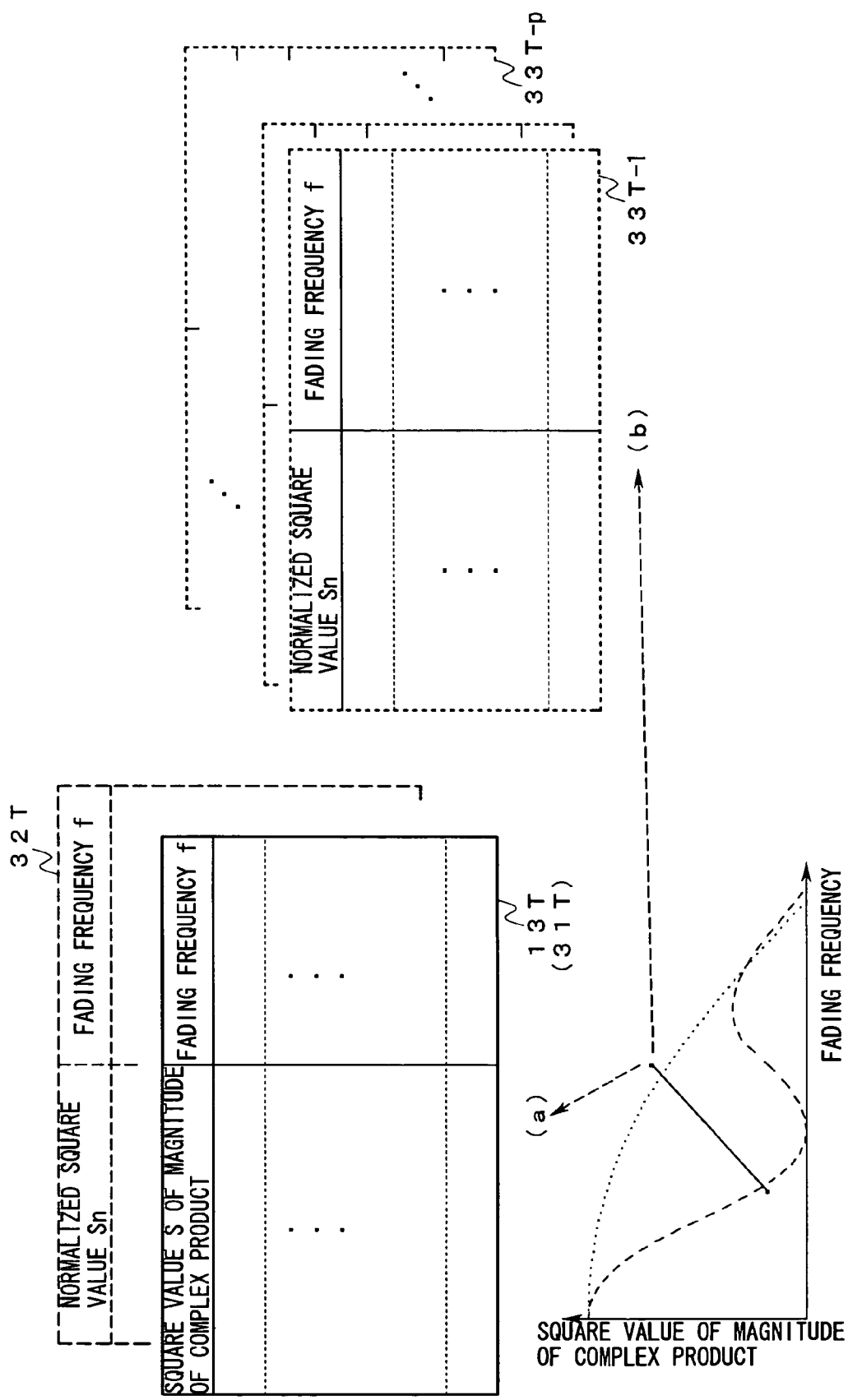
FIG. 3 shows the structures of square value tables.

As indicated by symbol (a) in FIG. 3, the judging unit 13 has a square value table 13T containing in advance a discrete array of sets of an estimated value of a fading frequency f of received waves and the square value of a time correlation value $\rho(\tau)$ (described above) that is determined for the product of the estimated value, the interval $\tau$, and a constant coefficient $2\pi$.

Further, the judging unit 13 refers to the square value table 13T on the basis of the square value S that is supplied from the magnitude calculating unit 12 as described above, and thereby determines a square value (hereinafter referred to as particular square value) that is smallest (or having a smallest deviation from the square value S) among square values larger than the square value S. The judging unit 13 estimates the fading frequency f of the received waves to be a value corresponding to the particular square value. In the following description, processing of determining such a particular square value will be referred to as threshold judgment.

As in the case of the conventional example, the channel estimating unit 85 performs channel estimation for determining transmission characteristics of the above-mentioned radio transmission paths on the basis of deviations of the above-mentioned pilot symbols among the sequences of symbols represented by the baseband signals i and q that are generated by the A/D converter 83. The number of pilot symbols, which is referred to in a process of such channel estimation, is set to a smaller value as the fading frequency f increases.

The square value S used for fading frequency estimation signifies amplitude correlation between a received pilot symbol $(P_{K,i}+jP_{K,q})$ and a pilot symbol $(P_{n,i}+jP_{n,q})$ that is received after a lapse of a delay time $\tau$ from the former pilot symbol on the time axis, and does not depend on the phase deviation between those pilot symbols.

In general, the variation rate of the square value S is larger than that of the above-mentioned inner product even in a low fading frequency range.

The inner product $P_i$, which is obtained in the conventional example in place of the square value S, is calculated for the two pilot symbols $(P_{K,i}+jP_{K,q})$ and $(P_{n,i}+jP_{n,q})$ according to the following Equation (4), which is a simpler arithmetic operation than Equation (3):

$$P_i = P_{K,i}P_{n,i} + P_{K,q}P_{n,q} \tag{4}$$

However, this embodiment makes it unnecessary to correct phase errors in pilot symbols which accompanies calculation of values of trigonometric functions that requires much more throughput than the difference in throughput between Equations (3) and (4).

Therefore, the accuracy of an estimated fading frequency f of received waves is increased though the throughput is made much lower than in the conventional example. The accuracy of the channel estimation is increased because the number of pilot symbols is increased or decreased in accordance with the fading frequency that is estimated accurately and efficiently in this manner.

In this embodiment, the square value table 13T is referred to on the basis of an absolute value of a single complex product that is calculated with an assumption that the radio transmission path formed between the receiving station and the pilot symbol transmission side is a single path.

Figure 4:
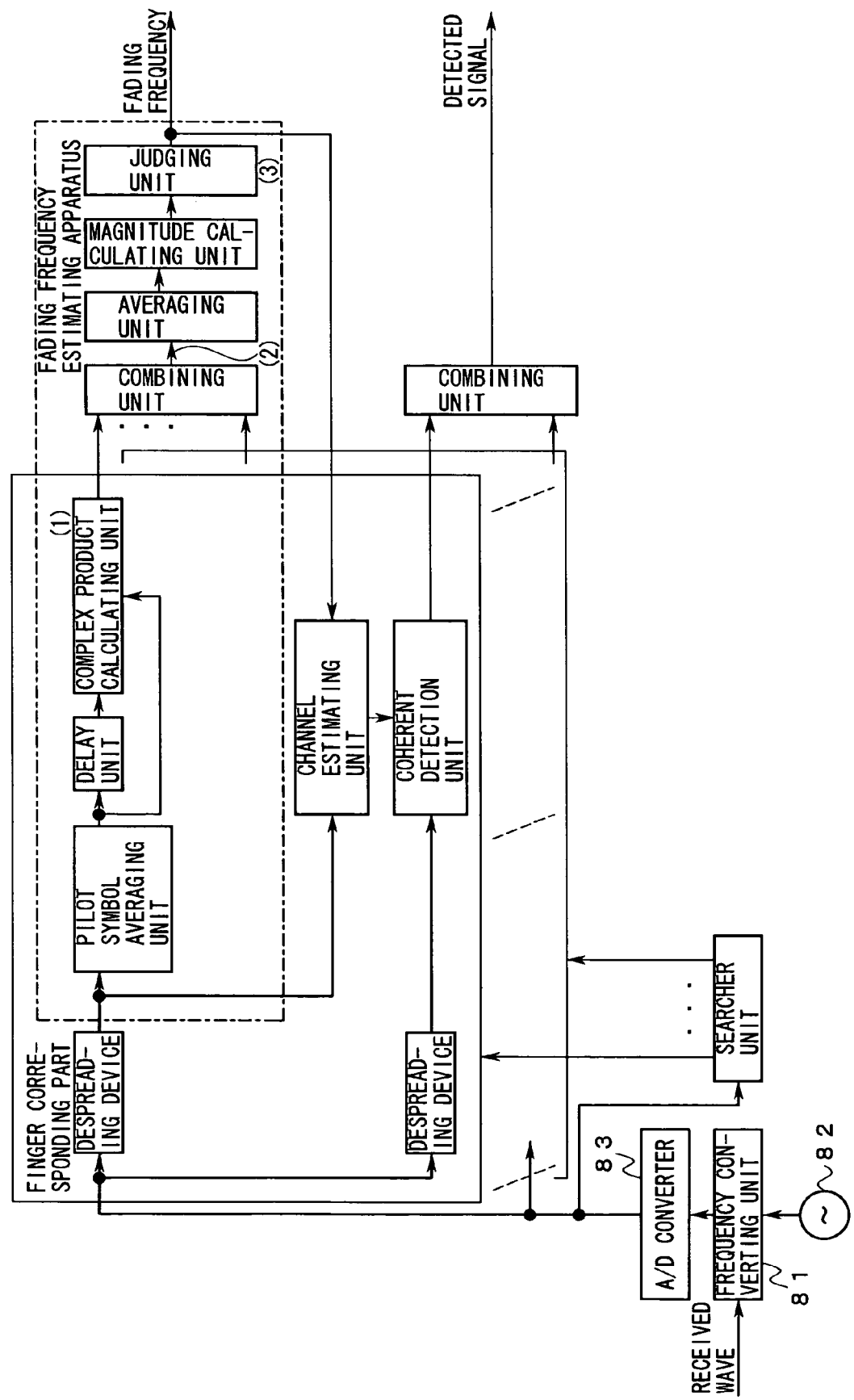
FIG. 4 shows another configuration of the first embodiment of the invention.

However, where the invention is applied to a CDMA (code division multiple access) radio communication system, for example, the accuracy of an estimated fading frequency may be increased by, for example, calculating complex products individually for elementary waves that arrive via a plurality of paths that are formed as multiple paths (indicated by symbol (1) in FIG. 4) and referring to the square value table 13T (indicated by symbol (3) in FIG. 4) on the basis of the sum (vector sum) of those complex products (indicated by symbol (2) in FIG. 4). The sum may be calculated as a sum of products of complex products and weights that conform to the states (e.g., elementary wave levels) of the respective multiple paths.

In this embodiment, a fading frequency f is estimated to be a value that is registered in advance in the 13T as corresponding to a square value S (the square value of a time correlation value between two pilot symbols).

However, the invention is not limited to the above configuration, and a value, such as the absolute value of a time correlation value $\rho(\tau)$ (described above), that does not depend on the phase deviation between pilot symbols like the square value S may be used in place of the square value S.

Second Embodiment

Figure 5:
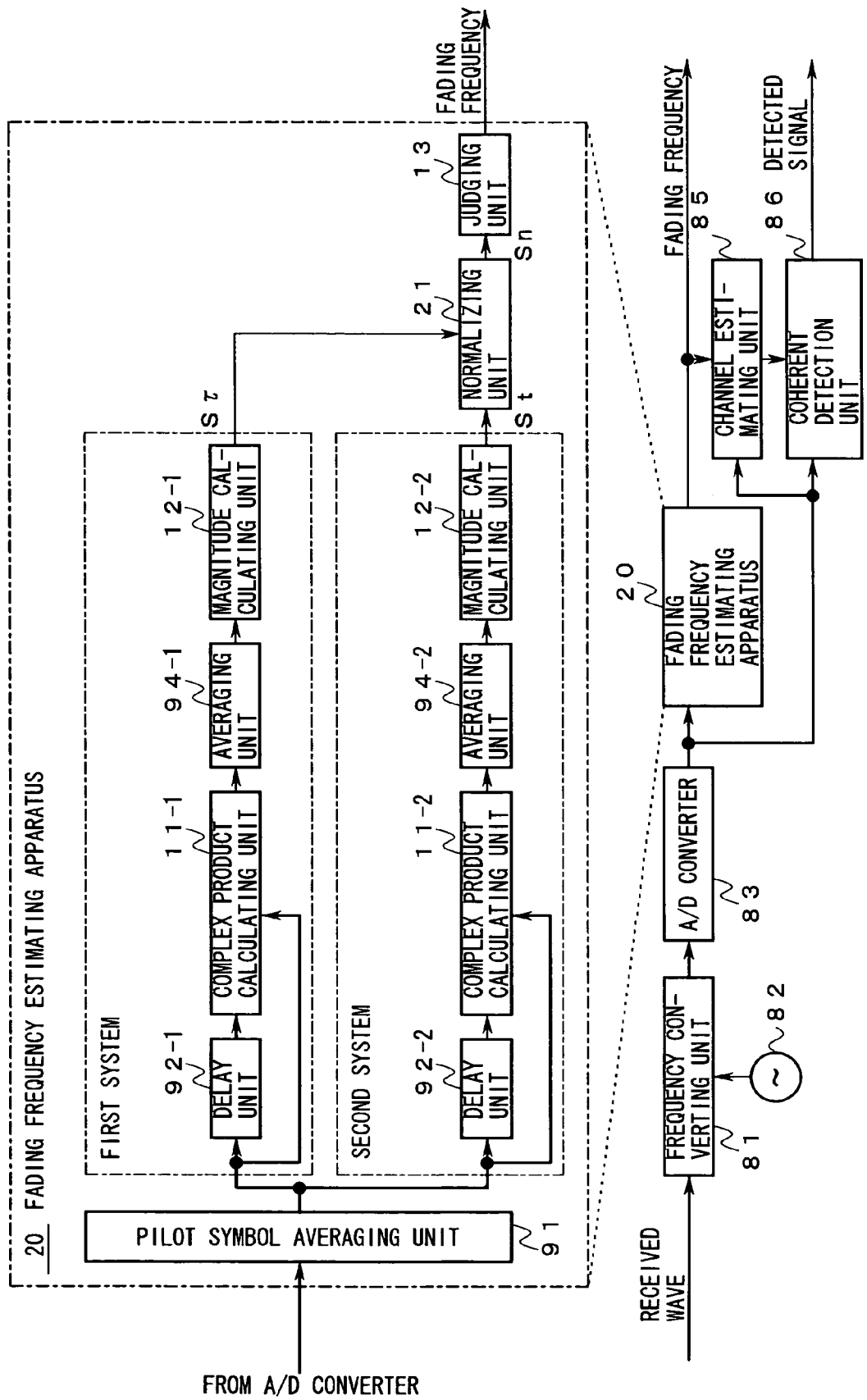
FIG. 5 shows a second embodiment of the invention.

FIG. 5 shows a second embodiment of the invention.

In this embodiment, a fading frequency estimating apparatus 20 is provided in place of the fading frequency estimating apparatus 10 shown in FIG. 1. The fading frequency estimating apparatus 20 is composed of the following components:

a pilot symbol averaging unit 91 that is disposed at the first stage;

delay units 92-1 and 92-2 whose inputs are connected to the output of the pilot symbol averaging unit 91;

a complex product calculating unit 11-1 whose first and second inputs are connected to the output of the delay unit 92-1 and the output of the pilot symbol averaging unit 91, respectively;

a complex product calculating unit 11-2 whose first and second inputs are connected to the output of the delay unit 92-2 and the output of the pilot symbol averaging unit 91, respectively;

a cascade-connected averaging unit 94-1 and a magnitude calculating unit 12-1 that are connected to the output of the complex product calculating unit 11-1;

a cascade-connected averaging unit 94-2 and a magnitude calculating unit 12-2 that are connected to the output of the complex product calculating unit 11-2;

a normalizing unit 21 whose first and second inputs are connected to the outputs of the magnitude calculating units 12-1 and 12-2, respectively; and a judging unit 13 that is connected to the output of the normalizing unit 21 and disposed at the final stage.

In the following description, the system including the delay unit 92-1, the complex product calculating unit 11-1, the averaging unit 94-1, and the magnitude calculating unit 12-1 will be called first system, and the system including the delay unit 92-2, the complex product calculating unit 11-2, the averaging unit 94-2, and the magnitude calculating unit 12-2 will be called second system.

The operation of this embodiment will be described below.

The delay unit 92-1, the complex product calculating unit 11-1, the averaging unit 94-1, and the magnitude calculating unit 12-1 of the first system calculates a square value by cooperating with each other like the delay unit 92, the complex product calculating unit 11, the averaging unit 94, and the magnitude calculating unit 12 shown in FIG. 1 do. In the following description, the square value thus calculated is represented by S$\tau$ because it corresponds to an interval $\tau$ that is set as a delay time in the delay unit 92-1.

On the other hand, a value t (>$\tau$) that is different from the interval $\tau$ is set as a delay time in the delay unit 92-2 of the second system.

The delay unit 92-2, the complex product calculating unit 11-2, the averaging unit 94-2, and the magnitude calculating unit 12-2 of the second system calculates a square value St by cooperating with each other like the delay unit 92, the complex product calculating unit 11, the averaging unit 94, and the magnitude calculating unit 12 shown in FIG. 1 do.

The normalizing unit 21 calculates a normalized square value Sn (=St/S$\tau$) on the basis of the square values St and S$\tau$.

The judging unit 13 refers to, on the basis of the normalized square value Sn, a normalized square value table 32T that is similar in structure to the above-mentioned square table 13T and contains fading frequencies corresponding to respective normalized square values, and thereby determines a particular square value that is smallest (or having a smallest deviation from the normalized square value Sn) among square values larger than the normalized square value Sn. The judging unit 13 estimates the fading frequency f of the received waves to be a value corresponding to the particular square value. In the following description, processing of determining such a particular square value will be referred to as threshold judgment.

The normalized square value Sn to be used for the above threshold judgment is calculated by normalizing the square value St calculated by the second system by the square value S$\tau$ which varies, in general, at a lower rate as the delay time $\tau$ is shorter and is calculated by the first system in which the delay time $\tau$ is set shorter than the delay time t of the second system.

That is, where the signal power and the noise power of received waves vary, the normalized square value Sn represents fading correlation more precisely than the square value S$\tau$ that is used for the threshold judgment in the first embodiment.

Therefore, this embodiment increases the accuracy of an estimated fading frequency than the first embodiment and can adapt to variations in the characteristics of the transmission paths.

Third Embodiment

Figure 6:
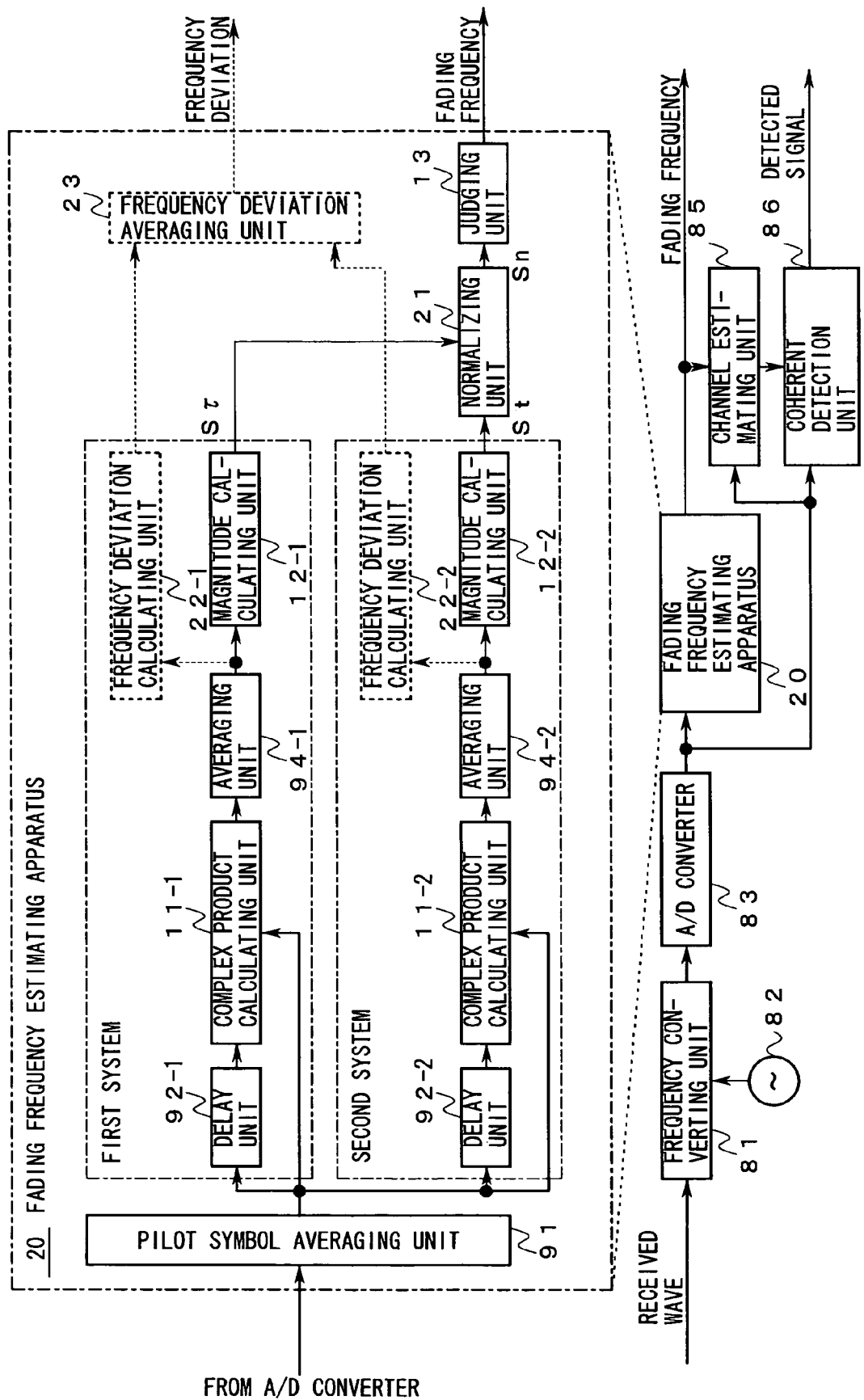
FIG. 6 shows a third embodiment of the invention.

FIG. 6 shows a third embodiment of the invention.

As shown in FIG. 6, this embodiment is different from the second embodiment in that the following components are added to the second embodiment:

a frequency deviation calculating unit 22-1 that is connected to the output of the averaging unit 94-1;

a frequency deviation calculating unit 22-2 that is connected to the output of the averaging unit 94-2; and a frequency deviation averaging unit 23 whose first and second inputs are connected to the outputs of the frequency deviation calculating units 22-1 and 22-2, respectively, and produces a frequency deviation at the output.

In the following description, it is assumed that the frequency deviation calculating units 22-1 and 22-2 are included in the first system and the second system, respectively.

The operation of the third embodiment of the invention will be described below with reference to FIGS. 2 and 6.

The frequency deviation calculating unit 22-1 determines a real part u ($=P_{K,i}P_{n,i}+P_{K,q}P_{n,q}$) and an imaginary part v ($=P_{K,q}P_{n,i}-P_{K,i}P_{n,q}$) of a complex product C1 ($=S\tau^{1/2}$) that is calculated by the complex product calculating unit 11-1 and supplied via the averaging unit 94-1.

In general, the following Equation (5) (see the bottom part of FIG. 2) holds for a phase deviation $\Delta\phi$ that is caused in received waves representing two pilot symbols that are input to the first system by a deviation in the oscillation frequency of the local oscillator 82 from the frequency of a standard local frequency signal that conforms to the received waves and a Doppler shift occurring in radio transmission paths, a value k obtained by normalizing the interval between the two pilot symbols by their cycle, an integer n indicating a time series, and the above-mentioned real part u and imaginary part v:

$$\Delta\phi \cdot k = \tan^{-1}(v/u) + 2\pi \cdot n \quad (5)$$

Where the interval $\tau$ on the time axis between the two pilot symbols that are used for calculating the complex product C1 is set sufficiently shorter than the reciprocal of a maximum value of the frequency deviation that may occur in a radio communication system to which this embodiment is applied, in general, the integer n is regarded as 0. Therefore, Equation (5) is modified into the following Equation (6):

$$\Delta\phi = \tan^{-1}(v/u)/k \quad (6)$$

The frequency deviation calculating unit 22-1 calculates a first phase deviation by performing an arithmetic operation of Equation (6) and then calculates a first frequency deviation as a variation rate of the first phase deviation in the time series.

The frequency deviation calculating unit 22-2 calculates a second phase deviation by performing the same arithmetic operation except that the interval between pilot symbols used is equal to t, and then calculates a second frequency deviation as a variation rate of the second phase deviation in the time series.

The frequency deviation averaging unit 23 calculates a frequency deviation in the received waves as an average value of the first frequency deviation and the second frequency deviation, and thereby lowers a reduction in accuracy corresponding to the frequency deviation that is caused by noise that is superimposed on the received waves.

Therefore, according to this embodiment, results of the calculations performed in the first system and the second system are utilized effectively and a frequency deviation is thereby calculated accurately.

In this embodiment, each of the frequency deviation calculating units 22-1 and 22-2 calculates a frequency deviation by performing the arithmetic operation of Equation (6).

However, in this arithmetic operation, the throughput may be reduced by, for example, looking up a table containing pre-calculated deviations $\Delta\phi$ for values or combinations of values that one or both of the pair of arguments (real part u and imaginary part v) and the value k can have.

In the second and third embodiment, the delay time of the delay unit 92-1 is set equal to the interval $\tau$ at which pilot symbols are received slot by slot.

Setting a shorter delay time is desirable because it lowers the variation rate of the complex product C1 calculated by the first system. However, the delay time need not always be set equal to the slot cycle.

Fourth Embodiment

Figure 7:
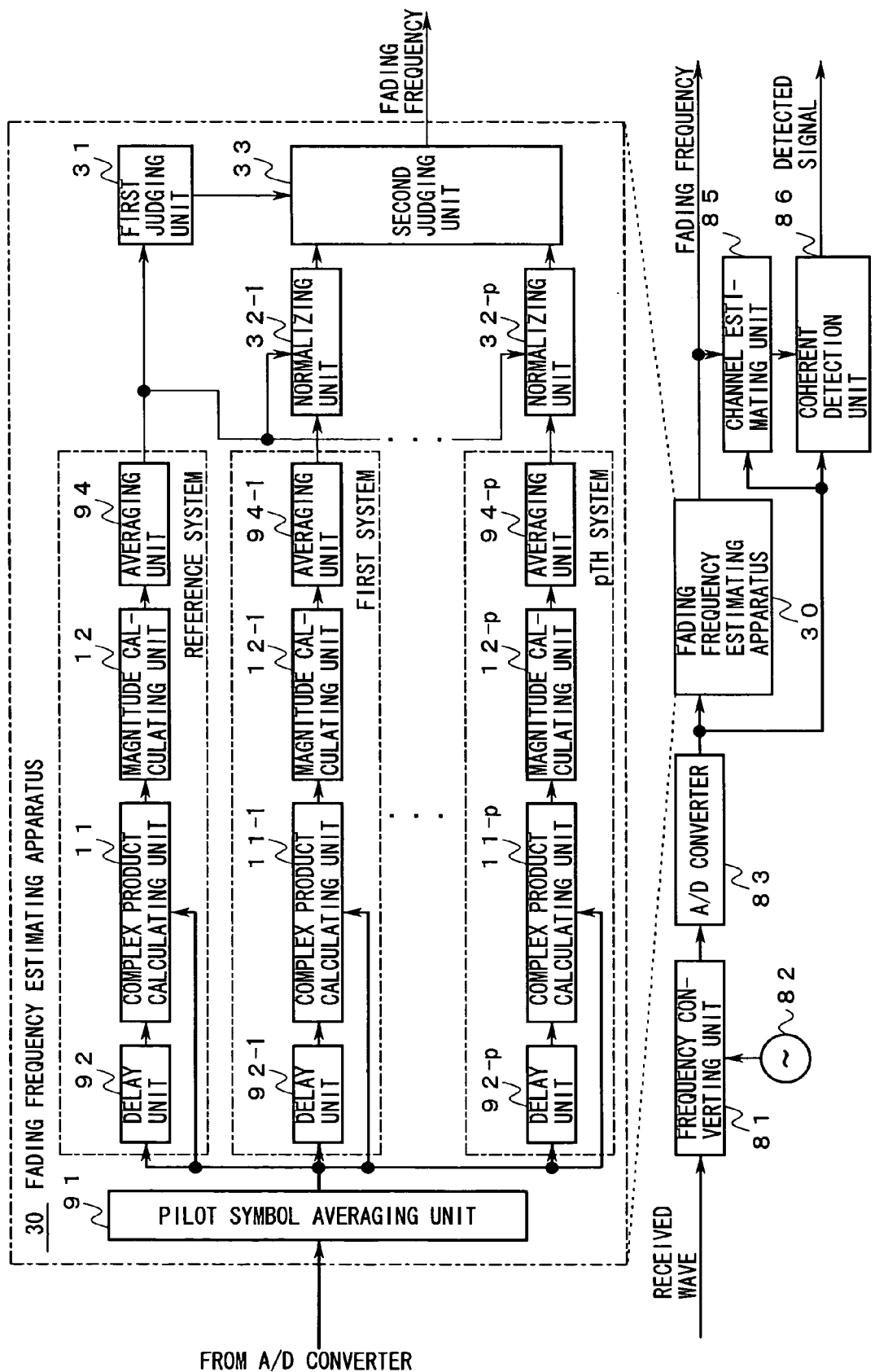
FIG. 7 shows a fourth embodiment of the invention.

FIG. 7 shows a fourth embodiment of the invention.

In this embodiment, a fading frequency estimating apparatus 30 is provided in place of the fading frequency estimating apparatus 10 shown in FIG. 1. The fading frequency estimating apparatus 30 is composed of the following components:

a pilot symbol averaging unit 91 that is disposed at the first stage;

a reference system that is disposed downstream of the pilot symbol averaging unit 91 and that is composed of the delay unit 92, the complex product calculating unit 11, the averaging unit 94, and the magnitude calculating unit 12 of the first embodiment;

first to pth systems (p$\geq$2) that are disposed downstream of the pilot symbol averaging unit 91 in parallel with each other and with the reference system and that have the same basic configuration as the reference system;

a first judging unit 31 that is connected to the output of the reference system;

normalizing units 32-1 to 32-p whose first inputs are connected to the output of the reference system together with the input of the first judging unit 31; and a second judging unit 33 that has a plurality pof inputs connected to the outputs of the first judging unit 31 and the normalizing units 32-1 to 32-p, respectively, and that produces a fading frequency at the output.

In the following description, the components of the first system to the components of the pth systems are denoted by reference symbols having suffixes "1" to "p," respectively.

Figure 8:
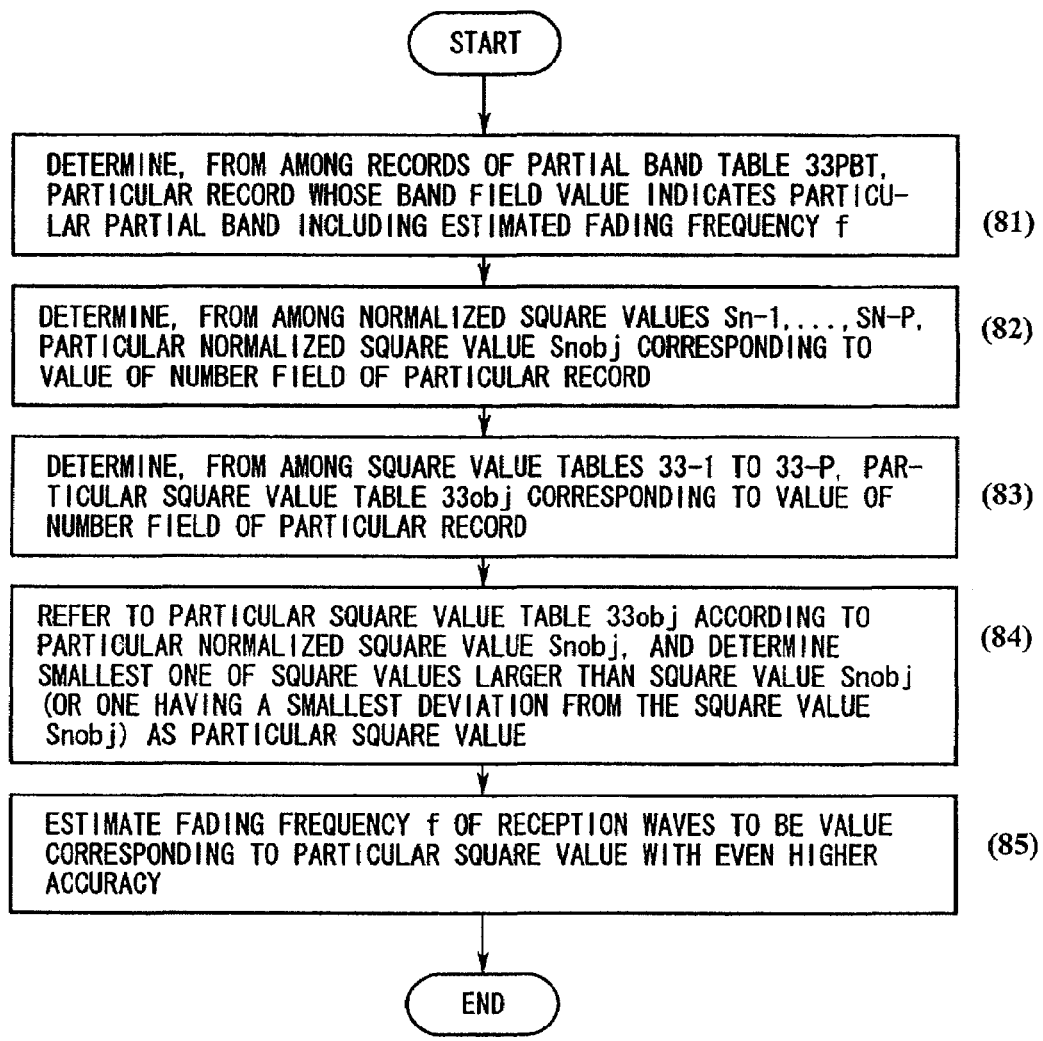
FIG. 8 is a flowchart showing the operation of a second judging unit in the fourth embodiment of the invention.

FIG. 8 is a flowchart showing the operation of the second judging unit 33 in the fourth embodiment of the invention. The operation of the fourth embodiment will be described below with reference to FIGS. 7 and 8.

The delay units 92-1 to 92-p of the first to pth systems have in advance different delay times $\tau 1$ to $\tau p$ respectively that correspond to partial bands of a range of estimated fading frequencies and that allow the square value of a time correlation value $\rho(\tau)$ (described above) to vary at such a high rate as to keep a sufficiently high accuracy of an estimated fading frequency in each partial band. In the following description, it is assumed that the delay times $\tau 1$ to $\tau p$ are set in ascending order ($\tau 1$ is shortest) and are longer than the delay time $\tau$ that is set in the reference system (i.e., delay unit 92).

One of operations of the fourth embodiment is as follows.

The first judging unit 31 calculates a normalized square value $S\tau$, and determines the number of a system to be used by the second judging unit 33 that corresponds to the normalized square value $S\tau$ by referring to a system number table shown in FIG. 10 according to the normalized square value $S\tau$.

The second judging unit 33 calculates a normalized square value $S\tau$ for only the system indicated by the above number, and determines (estimates) a fading frequency by referring to a corresponding one of tables indicated by symbol (b) in FIG. 3 on the basis of the normalized square value $S\tau$.

Since the second judging unit 33 performs processing for only the related system, the throughput can be reduced.

Another operation of the fourth embodiment is as follows.

As indicated by symbol (a) in FIG. 3, the first judging unit 31 has a square value table 31T containing in advance a discrete array of sets of an estimation value of a fading frequency f of received waves and the square value S of a time correlation value ρ(τ) (described above) that is determined for the product of the estimation value, the interval τ, and a constant coefficient 2π.

On the other hand, as indicated by symbol (b) in FIG. 3, the second judging unit 33 has normalized square value tables 33T-1 to 33T-p each containing in advance an array of sets that are determined in the same manner as in the normalized square value table 32T by applying each of the delay times τ1 to τp instead of the interval τ.

As shown in FIG. 9, the second judging unit 33 also has a partial band table 33PBT which contains an array of records each of which consists of a number field containing a number (one of 1 to p) that corresponds to and indicates one of the first to pth systems and a band field indicating a range of a fading frequency partial band corresponding to a system indicated by the value of the number field.

The reference system calculates a square value Sτ like the first system of the second embodiment does, and the first judging unit 31 estimates a fading frequency f on the basis of the square value Sτ like the judging unit 13 of the second embodiment does.

On the other hand, the first to pth systems calculates square values (hereinafter represented by St-1 to St-p) like the second system of the second embodiment does except that the delay times τ1 to τp are used.

The normalizing units 32-1 to 32-p calculate normalized square values Sn−1 (=St−1/Sτ), . . . , Sn−p (=St−p/Sτ) on the basis of the square values St−1 to St−p, respectively.

The second judging unit 33 performs the following processing:

(1) Determines, from the records in the partial band table 33PBT, a record (hereinafter particular record) whose band field value indicates a partial band (hereinafter particular partial band) including the above-estimated fading frequency f (step (1) in FIG. 8);

(2) Determines, from the normalized square values Sn−1, . . . , Sn−p, a normalized square value Snobj (hereinafter particular normalized square value) which corresponds to the value of the number field of the particular record (step (2) in FIG. 8);

(3) Determines, from the square value tables 33T-1 to 33T-p, a square value Table 33obj (hereinafter particular square value table) which corresponds to the value of the number field of the particular record (step (83) in FIG. 8);

(4) Refers to the particular square value table 33obj according to the particular normalized square value Snobj, and determines smallest one (or one having a smallest deviation from the square value Snobj) as particular square value from square values larger than the square value Snobj (step (4) in FIG. 8); and (5) Estimates the fading frequency f of the received waves to be a value corresponding to the particular square value with even higher accuracy (step (5) in FIG. 8).

That is, a fading frequency f is estimated by using one of the different delay times τ1 to τp so as to allow the square value of a time correlation value ρ(τ) (described above) to vary at a high rate and to keep a high estimation accuracy in a partial band including a fading frequency roughly estimated by the first judging unit 31 in advance.

Therefore, according to this embodiment, in the case where delay times and square value tables for respective partial bands are determined in advance, a fading frequency can be estimated with higher accuracy as the number of partial bands increases.

In this embodiment, a single particular square value table is determined to estimate a fading frequency f. However, the invention is not limited to such a configuration. For example, the fading frequency f may be estimated to be an average value of fading frequencies that are estimated according to square value tables corresponding to a particular partial band and a single or plurality of partial bands adjacent to the particular partial band on the frequency axis, respectively.

In this embodiment, the first judging unit 31 is provided, and a fading frequency f is estimated accurately by the processings of the second judging unit 33 using the fading frequency roughly estimated by the first judging unit 31 as a reference. However, the invention is not limited to such a configuration. For example, one of the first to pth systems may serve as the reference system in the following manner. The second judging unit 33 sets delay times for the respective delay units 92 and 92-1 to 92-p and performs the processing that should be performed by the first judging unit 31 and the normalizing units 32-1 to 32-p.

Where the second judging unit 33 performs such processing, it may also set and update delay times of the delay units 92 and 92-1 to 92-p under an automatic control or an adaptive control for maintaining the accuracy of an estimated fading frequency.

When the threshold is judged under such an automatic control or adaptive control, the accuracy of the estimated fading frequency may be increased by narrowing the widths of the partial bands sequentially. Moreover, the invention may also be configured to enhance the estimation accuracy and to adapt to large variations in the characteristics of radio transmission paths by increasing the widths of the partial bands in a period when a fading frequency estimation value cannot be obtained or cannot be obtained with desired accuracy.

In this embodiment, the first to pth systems operate in parallel with the reference system. However, the invention is not limited to such a configuration. Where the fading frequency determining factors are statistically stationary in propagation paths of received waves, for example, one of the first to pth systems corresponding to a particular partial band may start operating after determination of the particular partial band. In such a case, the hardware scale and the power consumption may be reduced by providing, in place of the first to pth systems, a single system whose delay time is set by the second judging unit 33.

Further, in this embodiment, the partial bands are arranged on the frequency axis without any overlaps. However, the invention is not limited to such a configuration. For example, in a case where the threshold judgment is performed in a such a way that a particular square value as smallest and larger than a determined square value is determined by searching the records of one of the square value tables 33T-1 to 33T-p according to the determined square value to estimate the fading frequency at a value to correspond to the particular square value, adjacent partial bands may be arranged to overlap by one or both of the lower end and upper end portions as indicated by broken lines in FIG. 11, which can also achieve an accurate threshold judgment in each partial band, for example.

Fifth Embodiment

FIG. 12 shows a fifth embodiment of the invention.

This embodiment is different from the fourth embodiment in the configuration of the reference system. The reference system is configured as follows:

an inner product calculating unit 41 is provided in place of the complex product calculating unit 11;

a frequency deviation correcting unit 42 is provided between the delay unit 92 and the inner product calculating unit 41; and a magnitude calculating unit 12 is not provided and the output of the inner product calculating unit 41 is connected to the input of the averaging unit 94.

The operation of this embodiment will be described below.

The delay unit 92 delays pilot symbols represented by two orthogonal partial baseband signals i' and q' generated by the pilot symbol averaging unit 91, by a time equal to, for example, a cycle τ of slot-by-slot transmission of the pilot symbols from a mobile station.

The frequency deviation correcting unit 42 generates a complex signal $P_{K,i'} + jP_{K,q'}$ whose real part $P_{K,i'}$ and imaginary part $P_{K,q'}$ are given by the following Equations (7) and (8) for a received pilot symbol $P_{K,i} + jP_{K,q}$, the number n of slots containing a pilot symbol that is received prior to the former pilot symbol and is a subject of correction, and a phase deviation Δφ (mentioned above), and thereby corrects a frequency deviation caused by both of the following first deviation and second deviations.

$$P_{K,i'} = P_{K,i} \cos(n\Delta\phi) + jP_{K,q} \sin(n\Delta\phi) \quad (7)$$

$$P_{K,q'} = -P_{K,i} \sin(n\Delta\phi) + jP_{K,q} \cos(n\Delta\phi) \quad (8)$$

First deviation resulting from the oscillation frequency of the local oscillator 82 of the receiving station (i.e., a frequency deviation between the local oscillator 82 of the receiving station and a local oscillator of a transmitting station).

Second deviations due to the Doppler effect occurring in the frequencies of received waves in propagation paths thereof.

The inner product calculating unit 41 calculates an inner product $P_{I'}$ according to the following Equation (9) for the vector signal $P_{K,i'} + jP_{K,q'}$ and a pilot symbol $P_{n,i} + jP_{n,q}$ that is received later:

$$P_{I'} = P_{K,i'} P_{n,i} + P_{K,q'} P_{n,q} \quad (9)$$

Received after the frequency deviation is compensated as the above-mentioned complex product C, the inner product $P_{I'}$ signifies amplitude correlation between the received pilot symbol $P_{K,i} + jP_{K,q}$ and the pilot symbol $P_{n,i} + jP_{n,q}$ that is received after a lapse of the time τ on the time axis from the reception of the former pilot symbol and does not depend on the phase deviation between these pilot symbols.

Therefore, according to this embodiment, the invention can be applicable even to a receiving station including one or both of the inner product calculating unit 41 and the frequency deviation correcting unit 42 as existing hardware or software, by effectively utilizing such hardware or software.

Figure 13:
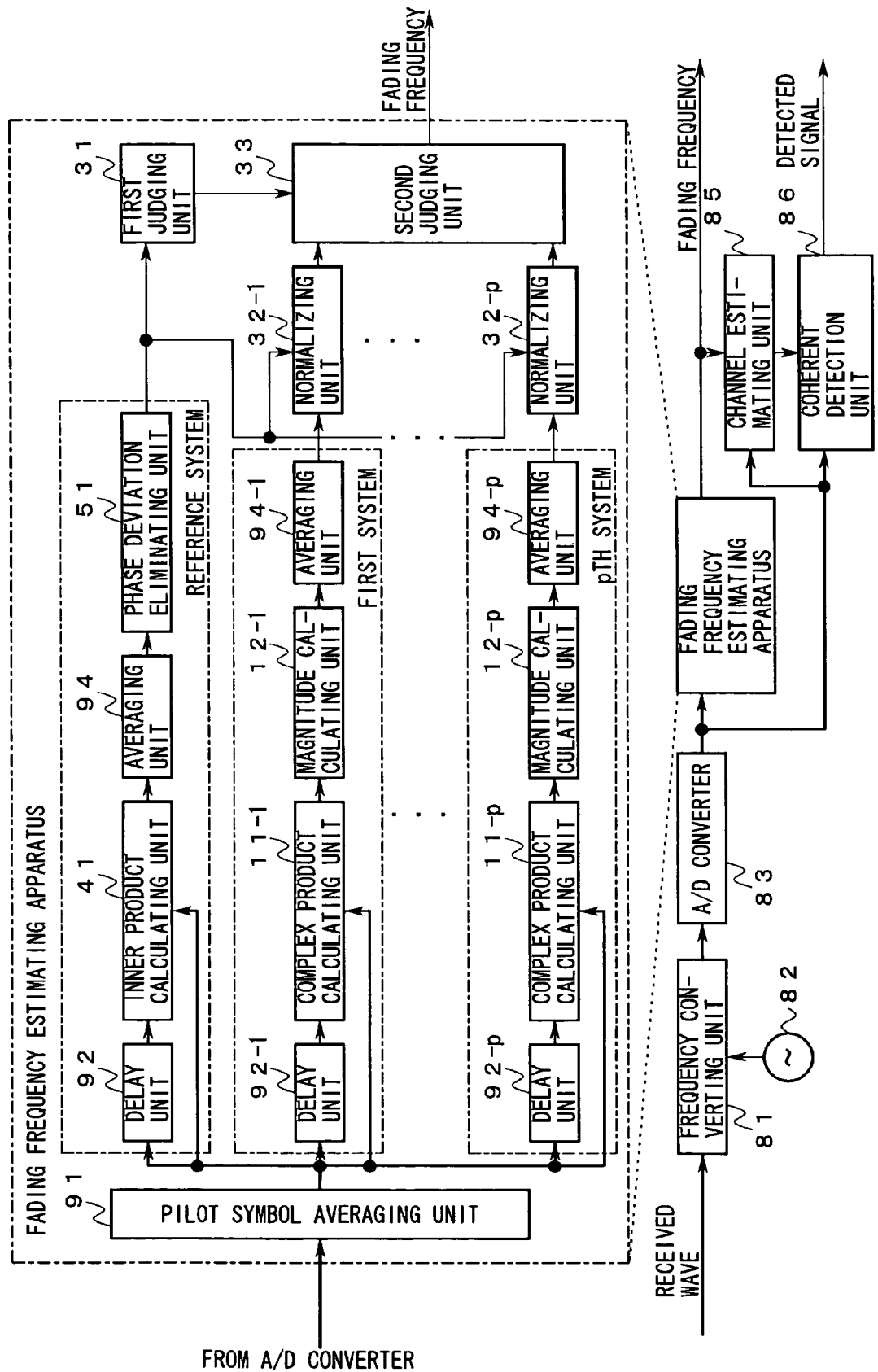
FIG. 13 shows another configuration of the fifth embodiment of the invention.

In this embodiment, the inner product calculating unit 41 is provided in place of the complex product calculating unit 11 and the frequency deviation correcting unit 42 is disposed upstream of the inner product calculating unit 41. However, the invention is not limited to such a configuration. For example, the reference system may be configured as follows as shown in FIG. 13:

Includes a frequency correcting unit 42 and the output of the delay unit 92 is connected to the corresponding input of the inner product calculating unit 41; and A phase deviation eliminating unit 51 for suppressing a phase deviation by dividing an average value $u_n$ of calculated inner products by a cosine value (=cos(nΔφ)) is disposed downstream of the averaging unit 94.

In each of the above embodiments, pilot symbols are received via both of two orthogonal channels I and Q. Alternatively, pilot symbols may be received via only one of the channels I and Q if it enables a complex operation for calculating a complex product or an inner product described above.

The invention is not limited to the above embodiments and various modifications may be made without departing from the spirit and scope of the invention. Any improvement may be made in part or all of the components.

What is claimed is:

1. A fading frequency estimating apparatus comprising:

an arithmetic operation unit which calculates magnitudes m1 to mp-1 of products of a first symbol and second to pth symbols in their complex domain, the first to pth symbols being associated with a same signal position and received at p different instants t1 to tp in time-series order, respectively, p being greater than or equal to 3;

a rough estimation unit which roughly estimates a fading frequency to be such a value that the magnitude m1 corresponds to an absolute value of a first time correlation value between the first and second symbols, the first time correlation value depending on a difference τ=t2−t1 between different instants t1 and t2 on the time axis and on a wavelength λ of a carrier wave used for transmission of the plurality p of symbols;

a storing unit which stores therein in advance bands in which a fading frequency is obtained with desired accuracy at such values that correspond to second to (p-1)th time correlation values between the first symbol and third to pth symbols, the second to (p-1)th time correlation values depending on the wavelength λ and respective differences τ1=t3−t1, . . . , τp-2 =tp−t1 between the instant t1 and the different instants t3 to tp on the time axis; and an estimation unit which estimating a fading frequency to be such a value that a magnitude mi corresponds to an absolute value of an ith time correlation value of the second to (p-1)th time correlation values, the ith time correlation value corresponding to a particular band that is stored in said storing unit and including the roughly estimated fading frequency, i satisfying a relationship 2≦i≦p-1.

2. The fading frequency estimating apparatus according to claim 1, wherein said arithmetic operation unit calculates a magnitude of a product of each pair of symbols from a combined wave of a plurality of received waves transmitted via multiple paths.

3. The fading frequency estimation apparatus according to claim 1, wherein after the particular band is determined, said arithmetic operation unit calculates magnitudes m2 to mp-1 of individual products of the first symbol and the third to pth symbols in their complex domain.

4. A fading frequency estimating apparatus comprising:

a particular arithmetic operation unit which corrects a phase deviation in first and second symbols of a plurality p of symbols and then calculates an inner product thereof, the plurality p of symbols being associated with a same signal position and received at p different instants t1 to tp in time-series order, respectively, p being greater than or equal to 3, the phase deviation caused from a frequency deviation in a local frequency signal used for receiving the plurality p of symbols;

an arithmetic operation unit which calculates magnitudes m2 to mp-1 of individual products of the first symbol and the third to pth symbols in their complex domain;

a rough estimation unit which roughly estimates a fading frequency to be such a value that the inner product corresponds to a first time correlation value between the first and second symbols, the first time correlation value depending on a difference $\tau=t2-t1$ between different instants t1 and t2 on the time axis and on a wavelength $\lambda$ of a carrier wave used for transmission of the plurality p of symbols;

a storing unit which stores therein in advance bands in which a fading frequency is obtained with desired accuracy at such values that correspond to second to (p-1)th time correlation values between the first symbol and the third to pth symbols, the second to (p-1) correlation values depending on the wavelength $\lambda$ and respective differences $\tau1=t3-t1, \ldots, \tau p-2 =tp-t1$ between the instant t1 and different instants t3 to tp on the time axis; and an estimation unit which estimates a fading frequency to be such a value that a magnitude mi corresponds to an absolute value of an ith time correlation value of the second to (p-1)th time correlation values, the ith time correlation value corresponding to a particular band that is stored in said storing unit and including the roughly estimated fading frequency, i satisfying a relationship $2 \leq i \leq p-1$.

5. The fading frequency estimating apparatus according to claim 4, wherein said arithmetic operation unit calculates a magnitude of a product of each pair of symbols from a combined wave of a plurality of received waves transmitted via multiple paths.

6. A fading frequency estimating apparatus comprising:

a particular arithmetic operation unit which corrects a phase deviation in an inner product of first and second symbols among a plurality p of symbols that are associated with a same signal position and received at p different instants t1 to tp in time-series order, the phase deviation caused from a frequency deviation in a local frequency signal used for receiving the first and second symbols, p being greater than or equal to 3;

an arithmetic operation unit which calculates magnitudes m2 to mp-1 of individual products of the first symbol and the third to pth symbols in their complex domain;

a rough estimation unit which roughly estimates a fading frequency to be such a value that the corrected inner product corresponds to a first time correlation value between said first and second symbols, the first time correlation value depending on a difference $\tau=t2-t1$ between different instants t1 and t2 on the time axis and on a wavelength $\lambda$ of a carrier wave used for transmission of the plurality p of symbols;

a storing unit which stores therein in advance bands in which a fading frequency is obtained with desired accuracy at such values that correspond to second to (p-1)th time correlation values between the first symbol and the third to pth symbols, the second to (p-1) time correlation values depending on the wavelength $\lambda$ and respective differences $\tau1=t3-t1, \ldots, \tau p-2 =tp-t1$ between the instant t1 and different instants t3 to tp on the time axis; and an estimation unit which estimates a fading frequency to be such a value that a magnitude mi corresponds to an absolute value of an ith time correlation value of the second to (p-1)th time correlation values, the ith time correlation value corresponding to a particular band that is stored in said storing unit and including the roughly estimated fading frequency, i satisfying a relationship $2 \leq i \leq p-1$.

7. The fading frequency estimating apparatus according to claim 6, wherein said arithmetic operation unit calculates a magnitude of a product of each pair of symbols from a combined wave of a plurality of received waves transmitted via multiple paths.

* * * * *